US00RE35214E

United States Patent [19]

McGarry et al.

[11] E Patent Number: Re. 35,214

[45] Reissued Date of Patent: Apr. 23, 1996

[54] GROUNDED MAGNETIC DEVICE FOR REMOVING STATIC CHARGES

[75] Inventors: Kevin M. McGarry, Kirkwood, Mo.; Arnold A. Downs, Mt. Vernon, Ill.

[73] Assignee: M. Eileen McGarry, Los Angeles, Calif.

[21] Appl. No.: 385,038

[22] Filed: Feb. 7, 1995

Related U.S. Patent Documents

Reissue of:

[64] Patent No.: 5,331,503
Issued: Jul. 19, 1994
Appl. No.: 822,853
Filed: Jan. 21, 1992

[51] Int. Cl.[6] ..... H05F 3/00

[52] U.S. Cl. ..... 361/214; 361/220

[58] Field of Search ..... 361/212, 214, 361/220, 221, 222

[56] References Cited

U.S. PATENT DOCUMENTS

| | | | |
|---|---|---|---|
| 1,668,049 | 5/1928 | Clinton et al. . | |
| 4,494,166 | 1/1985 | Billings et al. | 361/214 |
| 4,737,809 | 4/1988 | Konno | 354/212 |
| 4,862,316 | 8/1989 | Smith et al. | 361/220 |
| 4,885,650 | 12/1989 | Banka et al. | 360/122 |
| 5,041,941 | 8/1991 | Carter et al. | 361/225 |
| 5,121,285 | 6/1992 | McClure | 361/214 |
| 5,150,273 | 9/1992 | LeVantine | 361/221 |
| 5,331,503 | 7/1994 | McGarry et al. | 361/214 |

*Primary Examiner*—Jeffrey A. Gaffin
*Attorney, Agent, or Firm*—Senniger, Powers, Leavitt & Roedel

[57] ABSTRACT

A device for removing static charges from a moving paper web includes two grounded and shielded permanent magnets with means to support each magnet on opposite sides of the moving web with the polarities of each magnet so oriented that the charge-neutral center plane of the magnet is perpendicular to the path of the web. The device removes static charges by exposing the paper web to a grounded magnetic field first of one polarity and then to a grounded magnetic field of the opposite polarity.

37 Claims, 2 Drawing Sheets

GROUNDED MAGNETIC DEVICE FOR REMOVING STATIC CHARGES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a method and apparatus for removing static electricity by use of a grounded magnetic field.

2. Description of the Related Art

Static electricity as is generated by the passage of webs of electrically non-conductive material over industrial equipment, creates substantial problems in many industries, for example the printing industry. Thus, charges caused by friction of paper passing against the dissimilar material of a printing press, conveyer or other machine may interfere with downline processes such as folding or stacking.

Methods heretofore used in dealing with static electricity include the use of powder sprays, silicon, etc. Such methods in reducing friction may increase maintenance problems, as those due to spray build-up, and may be unsuitable for use with many types of materials.

"Static bars" have been designed to discharge a constant current from a high voltage source to the paper to neutralize static build-up. These have been generally ineffective because of the continual variations in charge and in the location of the static charge build-up.

SUMMARY OF THE INVENTION

In the preferred embodiment of the present invention a strong grounded magnetic field is used to remove static charge build-up. As utilized with paper webs, for example, a statically charged web is passed between two elongated permanent magnet assemblies closely spaced in parallel alignment, and positioned traverse to the movement of the web. The magnetic assemblies are shielded along three elongated sides of each magnet to increase the density of the field emitted by the exposed side. Each magnet has it polarities oriented so that the charge-neutral center plane is parallel to the two opposite shielded sides. The result is that the opposite sides of the passing web are first simultaneously exposed to one polarity, and then to the opposite polarity.

While we are aware of no accepted theory regarding how magnetic flux interacts with static charges, it is believed that flux of one polarity attracts the static charges of opposite polarity and leads them to ground.

DESCRIPTION OF THE PREFERRED EMBODIMENTS

Figure 1:
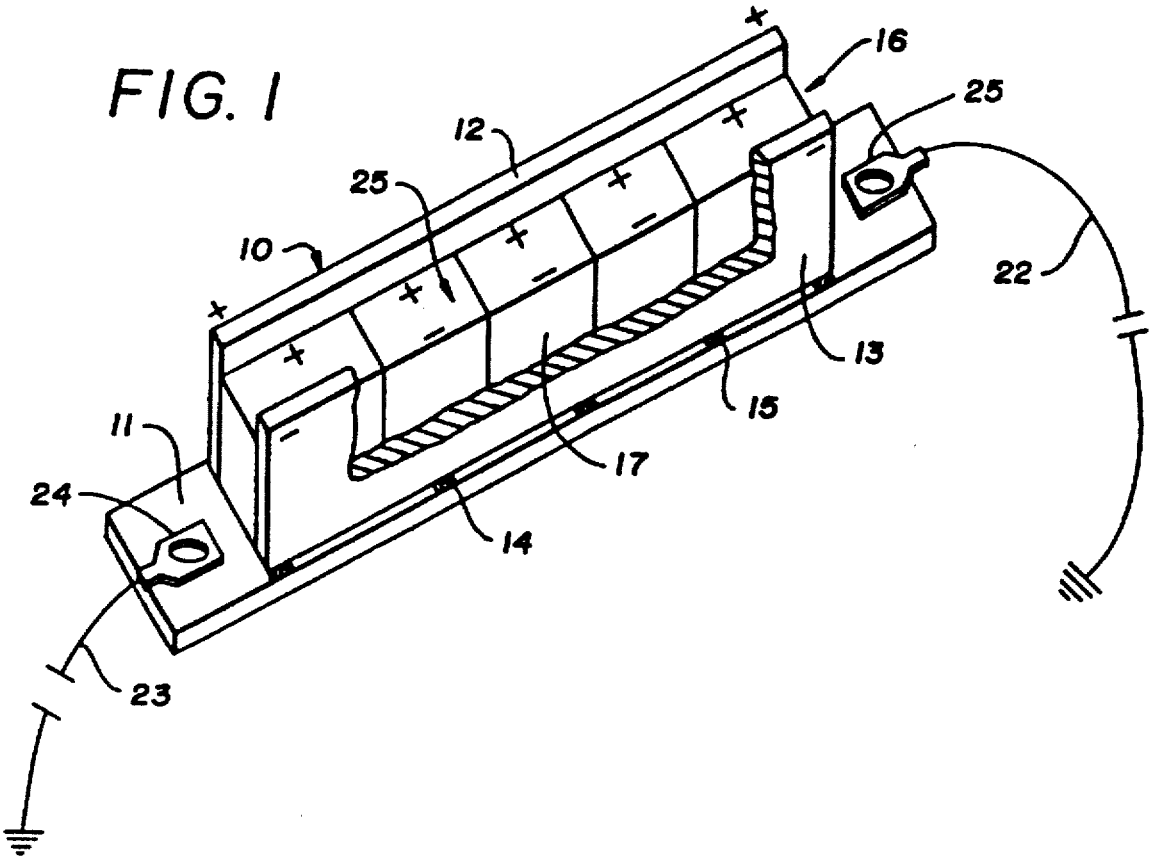
FIG. 1 is an isometric view of a magnetic device shielded on three sides embodying the present invention. In this illustration, the side shielding is broken away to show its assembly of several magnetic blocks of equal size. The base extends beyond the magnet assembly to allow clamping in position and for convenient grounding. The polarities of the magnet assembly are marked by plus and minus signs.

The magnetic device 10 shown in FIG. 1 utilizes a permanent magnet 16 constructed of several permanently magnetic blocks 17 of equal size. Each block has its polarities oriented along its elongated sides, their polarities being marked in FIG. 1. The blocks are assembled end-to-end. This construction allows use of a plurality of standard sized magnets 17 to construct a magnetic device 10 of custom length. This type of assembly is especially advantageous when the permanent magnet material is soft or brittle making manufacture of a single magnet of sufficient length impractical.

Figure 2:
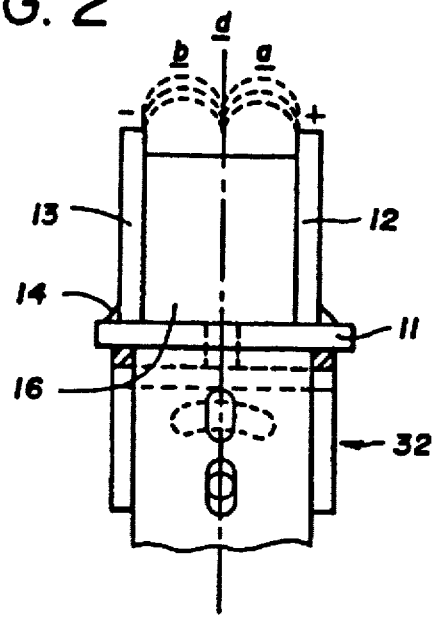
FIG. 2 is an end view of the FIG. 1 device. The dotted lines illustrate the idealized shape of the magnetic field as shielded and ideally emitted by the exposed surface of the device only. The charge-neutral center plane where the oppositely charged flux fields meet is also shown.

The permanent magnet 16 preferably made of the metal hereafter described is shielded on three sides by a base plate 11 and two side plates 12, 13 held to it along the side of opposite polarity of magnet 16 by welds 14, 15. The shielding serves in effect to shape and partially concentrate the magnetic field emitted; such a shielded field is ideally illustrated in FIG. 2, with the field of one polarity a and the field of opposite polarity b. The base shielding plate 11 is preferably longer than the magnet 16, its projecting ends haying bores 24, 25 to allow bolting of the apparatus in place, and preferably both ends of the base plate are connected to a relatively unimpeded electrical ground 22, 23. Side shielding plates 12, 13 are of a height slightly greater than the magnet 16, to protect the exposed surface 25 the magnet and to improve the "focus" of its magnetic field a, b.

The preferred material presently available for the permanent magnet 16 is believed to be strontium ferrite oxide ($SrO{\cdot}6Fe_2O_3$), a ceramic.

The shielding on the sides 12, 13 and base 11 of the magnet should, at current state of the art, be at least ¼ of an inch thick, preferably ⅜ths of an inch thick. The side shields 12, 13 preferably extend 1/16" beyond the exposed surface face 25 of the magnet. The presently preferred shield material is a steel alloy containing 30% to 50% nickel, commercially available from Ford Steel Co., St. Louis.

Figure 3:
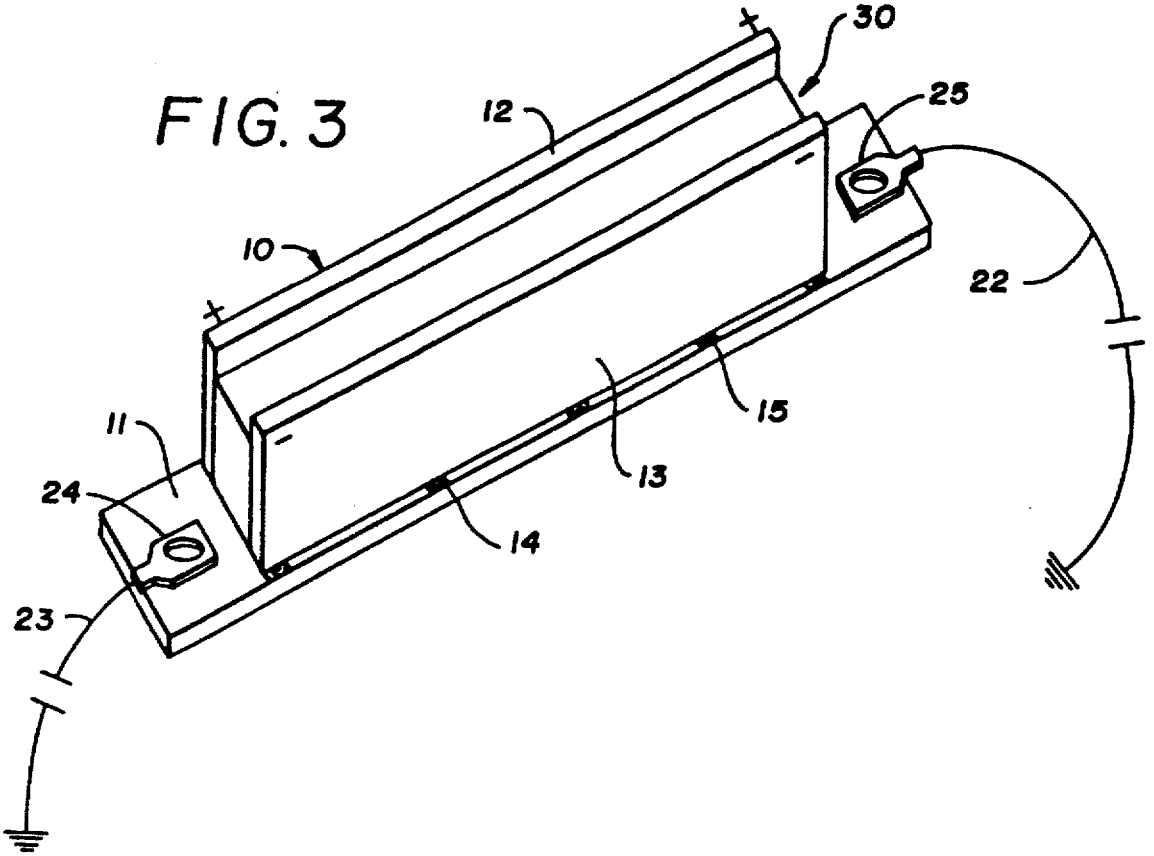
FIG. 3 is an isometric view of an alternative magnetic device in which a single magnet of the desired length is used.

The magnetic device 10 shown in FIG. 3 use a single permanent magnet 30 as an alternative to the FIG. 1 assembly 16.

Figure 4:
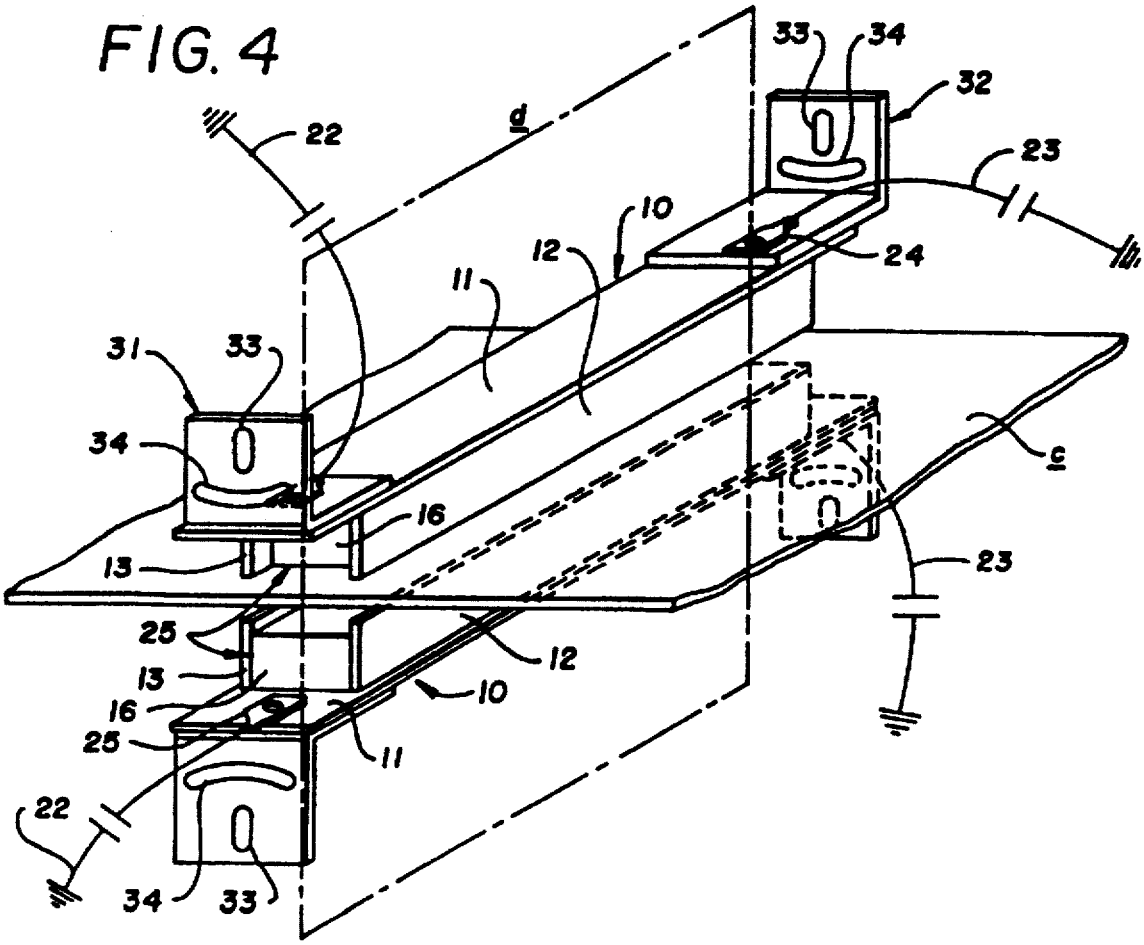
FIG. 4 is an isometric view illustrating movement of a web between the grounded magnetic devices of either the FIG. 1 or FIG. 3 type and supporting end brackets which maintain the parallel alignment and spacing of the device and to which grounds are connected.

For removing static electricity from both sides of a moving web c, use of two magnetic devices 10 of the FIG. 1 or FIG. 3. 3 type assembled together opposite each other as shown in FIG. 4 is preferred. Each of the two magnetic devices 10 is constructed preferably slightly longer than a width of a web c from which static charges are to be removed. The web c passes between the two narrowly spaced magnetic devices 10, they being supported and secured by brackets 31, 32 in parallel alignment, with their flux-emitting surfaces 25 facing each other, their like polarities being opposite to each other, and their common charge-neutral planes d perpendicular to the path of the moving web c. Each bracket 31, 32 preferably has a slotted mounting hole 33 and an arcuate slot 34 to facilitate relative spacing and alignment. Preferably each end of both the magnetic devices has electrical grounds 22, 23. The brackets 31, 32 are mounted so as to avoid metal-to-metal conductive contact between the magnetic apparatus 10 and the printing press or other equipment which is generating the static electricity on the moving web.

As used with a printing press, the two magnetic devices 10 are so positioned by brackets 31, 32 that the paper passes between them after exiting the printing press. The magnetic devices 10 are preferably spaced as close as is practical, say within one inch of each other, so that each side of the upper must pass within say ½ inch of an exposed surface 25 of the magnet.

The length of each magnetic device 10 is preferably slightly greater than the width of the web c, way a minimum one inch overlap on each end. The physical proportions of each device 10 must be determined by the magnitude of the static electricity present on the web c. We know of no mathematical equation to calculate the field strength required.

Readings of static electricity may be taken by a standard static charge meter such as Model ACL 400 sold under the trade name "Static Location", commercially available from ACL, Inc. Elk Grove, Ill., at several locations on the web c as it exits the printing press. Variables will affect the amount of static electricity; common variables include the speed of the press, the humidity in the air, and the type of web material moving through the press.

A magnetic device 10 of strontium ferrite oxide made of available standard size 1×2×6 inch blocks 17 having nominal properties of residual induction 390 m Tesla, commercially available from Crucible Magnetics Corp., Elizabethtown, Ky., as Ferrimag ®8A, when shielded as described herein will eliminate static charges up to (+) or (−) 30,000 Volts. An apparatus 10 constructed of blocks 17 of magnets of greater mass, for example 2×2×6 inch, may be necessary to eliminate greater quantities of static charge build-up.

Preferably each end of each magnetic device is connected to an isolated ground 22, 23.

Paper webs passing through this magnetic apparatus have been found to be substantially static free, eliminating a variety of common problems encountered in downline processes such as stacking and folding.

While grounding of the magnetic device at each end is generally preferred, in certain instances, such as when an extremely long magnetic device is constructed, additional intermediate grounds may be desirable.

While this apparatus has proven effective for use with moving webs, it may also be used with any material, regardless of shape, which is relatively non-conductive and therefor likely to accumulate static charges during manufacture or subsequent processing or use. Likewise, this apparatus may also be used in cases where the magnet moves relative to the materials, such as reciprocating movement by the magnet.

Sinc288 e various modifications may be made in the apparatus and use herein described without departing from the scope of the invention, all matter contained in the foregoing description shall be taken as illustrative rather than limiting.

We claim:

1. Apparatus for removing static electrical charges on a moving web passing therebetween, comprising in combination a pair of elongated magnetic device of substantially equal length, each of said pair of devices including an elongated end-to-end assembly of substantially rectangular permanently magnetic blocks of equal height and thickness, assembled with magnetic poles of one polarity aligned along the length of one side of said elongated assembly and magnetic poles of the opposite polarity aligned along the length of the opposite side of said elongated assembly;

said assembled blocks having two end surfaces and four side surfaces, and a means to provide for grounding of each said assembly, said assembled blocks having magnetic shielding on two opposite side surfaces and on one intermediate side surface, and being exposed on the other intermediate side surface, together with means to position the two said devices spaced narrowly apart in parallel alignment with their like polarities opposite each other so oriented as to provide a substantially common charge-neutral plane perpendicular to the path of such web.

*2. A process for removing a static electrical charge on a material as the material moves in response to a material moving apparatus, the process comprising the steps of:*

*positioning a magnet adjacent to the material moving apparatus; wherein the magnet produces a magnetic filed having first and second polarities;*

*grounding the magnet to provide a grounded magnetic field having said first and second polarities; and*

*moving the material and the magnet relative to each other so that the material passes through the first polarity of the grounded magnetic field and thereafter passes through the second polarity of the grounded magnetic field.*

*3. The process of claim 2 wherein the positioning step further comprises the step of positioning the magnet wherein the magnet produces a magnetic field having a field strength of at least 390 mTesla.*

*4. The process of claim 3 wherein the positioning step comprises the step of positioning a permanent magnet adjacent to the material moving apparatus; and wherein the grounding step comprises the step of grounding said magnet.*

*5. The process of claim 4 wherein the moving step further comprises the step of moving the material along a path spaced from the magnet.*

*6. The process of claim 5 further comprising the steps of:*

*positioning a second magnet adjacent to the first mentioned magnet; wherein the second magnet produces a magnetic field having first and second polarities corresponding to the first and second polarities of the first mentioned magnet;*

*grounding the second magnet to provide a grounded magnetic field; and*

*moving the material and both said magnets relative to each other so that the material passes between said magnets.*

*7. The process of claim 3 wherein the moving step further comprises the step of moving the material along a path spaced from the magnet.*

*8. The process of claim 2 wherein the positioning step further comprises the step of positioning the magnet wherein the magnet produces a magnetic field having a nominal field strength of 390 mTesla.*

*9. The process of claim 2 wherein the positioning step comprises the step of positioning a permanent magnet adjacent to the material moving apparatus; and wherein the grounding step comprises the step of grounding said magnet.*

*10. The process of claim 2 wherein the positioning step comprises the step of positioning an elongated permanent*

*magnet adjacent to the material moving apparatus; wherein said magnet has a length greater than a width of the material.*

*11. The process of claim 2 wherein the positioning step comprises the step of positioning an elongated permanent magnet adjacent to the material moving apparatus; wherein the length of said magnet is about 2 inches longer than the width of the material.*

*12. The process of claim 2 wherein the moving step further comprises the step of moving the material along a path spaced from the magnet.*

*13. The process of claim 2 wherein the positioning step further comprises the step of positioning the magnet wherein the magnet produces a magnetic field having a charge-neutral plane and wherein the moving step further comprises the step of moving the material along a path perpendicular to the charge-neutral plane.*

*14. The process of claim 2 further comprising the steps of:*

*positioning a second magnet adjacent to the first mentioned magnet; wherein the second magnet produces a magnetic field having first and second polarities corresponding to the first and second polarities of the first mentioned magnet;*

*grounding the second magnet to provide a grounded magnetic field; and*

*moving the material and both said magnets relative to each other so that the material passes between said magnets.*

*15. A process for removing a static electrical charge on a material as the material moves in response to a material moving apparatus, the process comprising the steps of:*

*positioning a magnet adjacent to the material moving apparatus; wherein the magnet produces a magnetic field having a field strength of at least about 390 mTesla; and*

*moving the material and the magnet relative to each other so that the material passes through the magnetic field.*

*16. The process of claim 15 wherein the positioning step comprises the step of positioning a permanent magnet adjacent to the material moving apparatus.*

*17. The process of claim 15 wherein the positioning step comprises the step of positioning an elongated permanent magnet adjacent to the material moving apparatus; wherein said magnet has a length greater than a width of the material.*

*18. The process of claim 15 wherein the moving step further comprises the step of moving the material along a path spaced from the magnet.*

*19. The process of claim 15 wherein the positioning step further comprises the step of positioning the magnet wherein the magnet produces a magnetic field having a charge -neutral plane and wherein the moving step further comprises the step of moving the material along a path perpendicular to the charge-neutral plane.*

*20. The process of claim 15 further comprising the steps of:*

*positioning a second magnet adjacent to the first mentioned magnet; wherein the second magnet produces a second magnetic field;*

*grounding the second magnet to provide a grounded magnetic field; and*

*moving the material and both said magnets relative to each other so that the material passes between said magnets.*

*21. Charge removing apparatus for removing a static electrical charge on a material as the material moves along a path in response to the material moving apparatus, the charge removing apparatus comprising:*

*a magnet positioned along the path of the material; wherein the magnet produces a magnetic field having first and second polarities; and*

*an electrical ground connected to the magnet to provide a grounded magnetic field having said first and second polarities;*

*said magnet positioned to produce the magnetic field in the path of the material such that, as the material moves relative to the magnet in response to the material moving apparatus, the material passes through the grounded magnetic field of the first polarity and thereafter passes through the grounded magnetic field of the second polarity.*

*22. The charge removing apparatus of claim 21 wherein the magnet produces a magnetic field having a field strength of at least 390 mTesla.*

*23. The charge removing apparatus of claim 21 wherein the magnet comprises a permanent magnet positioned adjacent to the material moving apparatus along the path of the material; and wherein the electrical ground is connected to said magnet.*

*24. The charge removing apparatus of claim 21 wherein the magnet comprises an elongated permanent magnet positioned adjacent to the material moving apparatus along the path of the material; and wherein said magnet has a length greater than a width of the material.*

*25. The charge removing apparatus of claim 21 wherein the position of the magnet is spaced from the path of the material.*

*26. The charge removing apparatus of claim 21 wherein the magnet produces a magnetic field having a charge-neutral plane; and wherein the magnet is positioned such that the charge-neutral plane is perpendicular to the path of the material.*

*27. The charge removing apparatus of claim 21 further comprising:*

*a second magnet positioned adjacent to the first mentioned magnet;*

*wherein the second magnet produces a magnetic field having first and second polarities corresponding to the first and second polarities of the first mentioned magnet; and*

*an electrical ground connected to the second magnet to provide a grounded magnetic field;*

*wherein the path of the material runs between said magnets.*

*28. Charge removing apparatus for removing a static electrical charge on a material as the material moves along a path in response to a material moving apparatus, the charge removing apparatus comprising:*

*a magnet positioned along the path of the material;*

*wherein the magnet produces a magnetic field having a field strength of at least about 390 mTesla;*

*said magnet positioned to induce the magnetic field in the path of the material such that, as the material moves relative to the magnet in response to the material moving apparatus, the material passes through the magnetic field.*

*29. The charge removing apparatus of claim 28 wherein the magnet comprises a permanent magnet positioned along the path of the material.*

*30. The charge removing apparatus of claim 28 wherein the magnet comprises an elongated permanent magnet posi-*

*tioned along the path of the material; wherein said magnet has a length greater than a width of the material.*

*31. The charge removing apparatus of claim 28 wherein the position of the magnet is spaced from the path of the material.*

*32. The charge removing apparatus of claim 28 wherein the magnetic field produced by the magnet has a charge-neutral plane; and wherein the magnet is positioned such that the charge-neutral plane is perpendicular to the path of the material.*

*33. The charge removing apparatus of claim 28 further comprising:*

*a second magnet positioned adjacent to the first mentioned magnet; and*

*an electrical ground connected to the second magnet to provide a grounded magnetic field;*

*wherein both said magnets are positioned with their respective magnetic fields in the path of the material such that, as the material moves relative to the magnets in response to the material moving apparatus, the material passes through the magnetic fields.*

*34. Charge removing apparatus for removing a static electrical charge on a material as the material moves along a path, the charge removing apparatus comprising:*

*a first magnet positioned along and spaced from the path of the material;*

*a second magnet positioned adjacent to the first magnet; wherein the magnetic poles of the first magnet are aligned with the corresponding magnetic poles of the second magnet;*

*an electrical ground connected to the first and second magnets wherein said magnets and ground provide a grounded magnetic field having afield strength of at least about 390 mTesla; and*

*means for moving the material and said magnets relative to each other so that the material passes between said magnets and through the grounded magnetic field.*

*35. Charge removing apparatus for removing a static electrical charge on a web of paper as the paper moves along a path through a printing press, the charge removing apparatus comprising:*

*a magnet positioned along the path of the web;*

*wherein the magnet provides a magnetic field having a field strength of at least about 390 mTesla; and*

*wherein said magnet is positioned with the magnetic field in the path of the web such that, as the web moves along the path through the printing press, the web passes through the magnetic field.*

*36. Charge removing apparatus for removing a static electrical charge on a paper comprising:*

*a paper moving apparatus;*

*a magnet positioned adjacent to the paper moving apparatus; and*

*an electrical ground connected to the magnet;*

*wherein the magnet and ground provide a grounded magnetic field having a field strength of at least about 390 mTesla; and*

*wherein the paper moving apparatus moves the paper and the magnet relative to each other so that the paper passes through the grounded magnetic field.*

*37. Charge removing apparatus for removing a static electrical charge on a material, the charge removing apparatus comprising:*

*a magnet to produce a magnetic field having a field strength of at least about 390 mTesla;*

*an electrical ground connected to the magnet to provide a grounded magnetic field; and*

*means for moving the material and the magnet relative to each other so that the material passes through the grounded magnetic field.*

* * * * *